Feb. 10, 1925.
F. A. FELDKAMP
1,525,985
INDICATING FILLING PLUG FOR STORAGE BATTERY CELLS
Filed Feb. 14, 1921
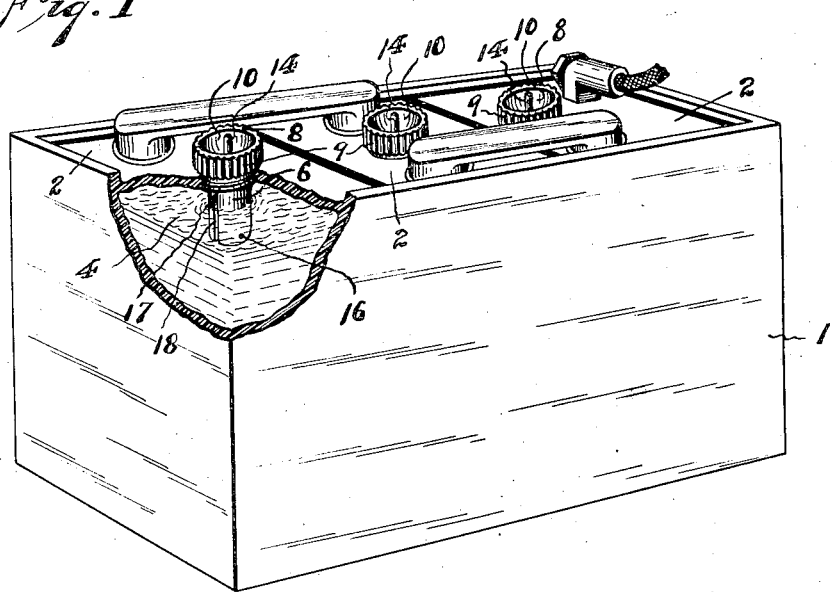
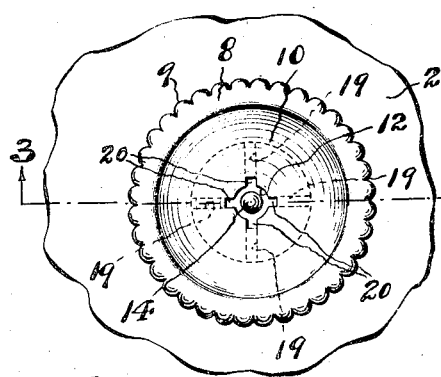
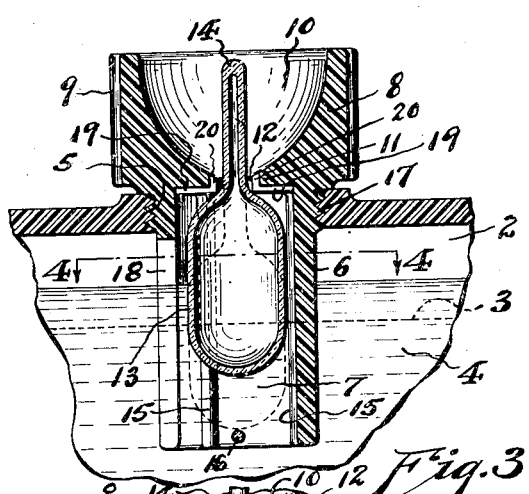
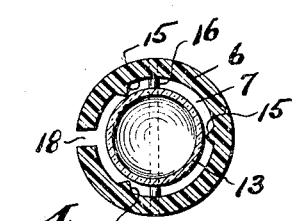
INVENTOR
Frederick A. Feldkamp,
BY
Frantzef and Richards,
ATTORNEYS Patented Feb. 10, 1925.

1,525,985

UNITED STATES PATENT OFFICE.

FREDERICK A. FELDKAMP, OF NEWARK, NEW JERSEY, ASSIGNOR OF ONE-HALF TO THOMAS J. CORCORAN, OF NEWARK, NEW JERSEY.

INDICATING FILLING PLUG FOR STORAGE-BATTERY CELLS.

Application filed February 14, 1921. Serial No. 444,934.

*To all whom it may concern:*

Be it known that I, FREDERICK A. FELDKAMP, a citizen of the United States, residing at Newark, in the county of Essex and State of New Jersey, have invented certain new and useful Improvements in Indicating Filling Plugs for Storage-Battery Cells; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in electric storage-batteries, and has reference more particularly to that type of electric storage-battery used with lighting and starting systems for automobiles.

It is well known that the storage cells of storage-batteries are required to be filled with distilled water to maintain the electrolyte at such a level therein that the electrodes or plates are entirely submerged. If the level of the electrolyte falls so as to expose a portion of the electrodes or plates to the air, sulphating of the electrodes is set up, which if neglected soon ruins the battery. It is therefore advised by storage-battery manufacturers that users see to it that the electrolyte level is maintained in each cell to an extent or depth of at least one-quarter inch above the tops of the electrodes or plates. Storage-battery cells, as heretofore constructed, are usually provided with filling openings for each cell normally closed by a screw plug or cap. In order to ascertain the level of electrolyte in any given cell it is necessary to unscrew and remove the screw plug or cap, and then the depth of the electrolyte may be ascertained by inspection and trial, as by insertion of a measuring rod thereinto, and if the plates or electrodes are in danger of exposure, then additional distilled water must be poured into the cell, and the measuring rod again employed to assure the user that the electrolyte has been brought up to the necessary level. It is evident that such procedure is not only annoying, but time consuming and crude, not to mention the fact that the user is quite likely to soil his fingers with the sulphuric acid solution forming the electrolyte in handling the measuring rod. Often the location of the battery in the ensemble of the automobile is such that it is difficult to get at the same for refilling or for testing the depth of electrolyte therein, and necessity for removal and replacement of the closure plugs or caps is an added inconvenience and annoyance. It is, therefore, the object of the present invention to provide a novel construction of plug or cap for insertion in the filling openings of storage-battery cells, which is adapted not only to provide a means for filling the cells without necessity of removing the plug or cap, but also to serve as an external visible and instant indicator of the level of the electrolyte within each cell, while at the same time said novel construction of plug or cap is also adapted to prevent outward splashing or spilling of the electrolyte from the cells and to provide a vent means to allow the escape of gases from within the cell, as the same are generated by the action of the electrodes.

A further object of the invention is to provide an indicating filling plug or cap which indicates at once when enough distilled water has been poured into the cell to bring the electrolyte to proper required level for the efficient operation and protection of the battery.

Other objects of this invention, not at this time more particularly enumerated, will be clearly understood from the following detailed description of the same.

With the various objects of the invention in view the same consists, primarily, in the novel construction indicating filling plug or cap for storage-battery cells hereinafter set forth; and, the invention consists, furthermore, in the novel arrangements and combinations of the various devices and parts as well as in the details of the construction of said parts, all of which will be hereinafter more fully described in the following specification and then finally embodied in the claim appended thereto.

The invention is clearly illustrated in the accompanying drawings, in which:—

Figure 1 is a perspective view of a storage-battery, the cells of which are equipped with the novel indicating filling plug or cap made according to and embodying the principles of the present invention.

Figure 2 is a top or plan view of my novel construction of indicating filling plug or cap, the same being drawn on an enlarged scale; Figure 3 is a vertical longitudinal section of the same, taken on line 3—3 in said Figure 2; Figure 4 is a horizontal section of the same, taken on line 4—4 in said Figure 3; and Figure 5 is a fragmentary vertical longitudinal section of the same, showing a slightly modified construction thereof.

Similar characters of reference are employed in all of the hereinabove described views, to indicate corresponding parts.

Referring now to said drawings, the reference character 1 indicates any suitable construction of secondary or storage-battery, the same having a plurality of cells 2 containing the usual electrodes or plates 3, and the electrolyte solution 4 in which said plates or electrodes 3 are to be maintained submerged. Each cell is provided with an internally screw-threaded opening 5 to receive the attachment of the novel indicating filling plug or cap which comprises the present invention.

Each indicating filling plug or cap is made of a suitable insulating material, preferably such as hard rubber or bakelite; although it may also be made of porcelain, glass or some such insulating material which is capable of resisting the attack of the acid-electrolyte. The said novel indicating filling plug or cap consists of a tubular main body 6, open at its lower end, and providing a vertical interior chamber or passage 7. Integrally connected with the upper end of said main body 6 is a head 8, of enlarged diameter, the external sides of which are preferably fluted as at 9, or otherwise roughened to provide a non-slipping gripping surface to be engaged by the fingers when attaching the filling plugs or caps to the battery. Formed in the upper end of said head 8 is a downwardly extending filling cup or funnel chamber 10. The upper end of said interior chamber or passage 7 is closed by the lower portion of the head 8, which thus provides a partition 11 intermediate the said chamber or passage 7 and said filling cup or funnel chamber 10. Centrally disposed in said partition 11, at the bottom of said filling cup or funnel chamber 10, is a communicating filling passage or opening 12 which leads downwardly into the upper end of said chamber or passage 7 of said main body 6.

The reference character 13 denotes an indicator float. This indicator float comprises an air-tight hollow body or bulb made of celluloid, glass or some suitable material not subject to attack by the acid electrolyte, the same having at its upper end an upwardly projecting indicator stem 14 of greatly reduced diameter; said stem forming either an integral or an attached part of said hollow body or bulb. Said indicator float is disposed for vertical movement within the interior chamber or passage 7 of said main body 6 of the plug or cap, with its stem 14 projecting through said filling passage or opening 12 upwardly into the interior of said filling cup or funnel chamber 10 so as to be exposed in visible position therein. Connected with the walls of said passage or chamber 7, so as to project inwardly from the inner side thereof, are a plurality of vertical longitudinal guide ribs 15, the same being spaced equally one from another. Said guide ribs 15 maintain the indicator float 13 centralized as to its vertical movement within said chamber or passage 7, and fend the same from frictional contact with the sides of said chamber or passage 7 tending to interfere with the free vertical movements of the same within said chamber or passage 7. In order to prevent outward displacement of said indicator float 13 through the lower open end of said main body 6, and to limit the downward movement to likewise prevent complete downward withdrawal of the stem 14 through the filling opening or passage 12, resulting in a disorganizing of the operative relation of the indicator float to the plug or cap, there is provided a transverse stop pin or bar 16 which passes through the walls and across the passage or chamber 7 of the main body 6 at the lower end of the latter.

Said main body 6 is provided at its upper end, adjacent to said head 8, with external screw-threads 17, so that when said main body 6 is thrust downwardly through the opening 5 of a battery cell, said threads 17 may be screwed into the internal thread of said opening 5 to thus secure the plug or cap in attached operative relation to said battery cell. When properly associated with a battery cell the main body 6 of the plug or cap depends from the upper wall of the cell so that its lower open end extends downwardly into the electrolyte contained therein, and in which the plates or electrodes of the cell are submerged. The electrolyte solution, when at proper level within the cell, enters the chamber or passage 7 through the open lower end of the main body 6, and engaging the indicator float 13 buoys up the same tending to cause the same to rise upwardly within the chamber or passage 7, so that its stem 14 is upwardly projected through the filling opening 12 to project upwardly through the filling cup or funnel chamber 10. When the said stem 14 is thus upwardly projected to full extent within the filling cup or funnel chamber it serves as a visible indicator denoting that the cell is sufficiently filled with electrolyte to properly cover the plates or electrodes therein, and that the said battery cell is in proper working condition. In order to assure the equalization of the level of the electrolyte, both within and exteriorly of the main body 6, the walls of the latter are provided at one side with a longitudinal slot or opening 18 extending from a point immediately below the threads toward the bottom end of said main body. This slot 18, the upper end of which is exposed above the normal surface level of the electrolyte, serves as an escape vent or passage for gases generated by the electrodes in the solution, so that said gas may pass from the upper end of the cell chamber through said slot into the upper end of the chamber or passage 7. In order to provide free vent passages communicating with the atmosphere, whereby the gases thus passing into the chamber or passage 7 may be freely discharged therefrom at all times, regardless of the position of the indicator float 13 (i. e., whether the latter is in fully raised position or not), there is provided in the under side of the partition 11 one or more transverse open ducts or channels 19 leading toward the periphery of the filling opening or passage 12. These open ducts or channels 19 communicate with corresponding vertical discharge ducts or channels 20 indented in the periphery of said filling opening or passage 12. It will be apparent that even when the indicator float 13 is fully raised, and engaged against the lower end of said filling opening or passage 12 so as to close the same, the gases to be vented will be permitted free escape or discharge through the inducted discharge ducts or channels 20.

Referring now to Figure 5 of the drawings, there is shown therein a slightly modified construction of the novel indicating filling plug or cap embodying the principles of the present invention, in the construction of which there is substituted for the gas vent slot 18, one or more perforations 21 located in the walls of the main body 6 at a point above the normal level at which the electrolyte solution is to be maintained. As is also indicated in said Figure 5, the guide-ribs 15 may be omitted from the walls of the main body 6 if desired.

From the above detailed description of the present invention it will be understood that in the event the proper normal level of electrolyte solution, by reason of evaporation or from other causes, is lowered within the cell, the indicator float 13 will descend or drop within the chamber or passage 7, so that the stem 14 is downwardly withdrawn or lowered in the filling cup or funnel chamber 10. A glance into the filling cup or funnel chamber 10 is sufficient to disclose the changed position of said stem 14, and consequently at once warns the user to refill the cell with distilled water to increase the volume of electrolyte and thus raise the level of the same to the proper condition, thus obviating all necessity of removing the plug or cap and testing the depth of the electrolyte by the insertion into the cell of a measuring rod or other testing means. When it appears from an inspection of the stem 14 of indicator float 13, that a given cell needs replenishing with distilled water, it is unnecessary to remove the plug or cap, since the same serves as a filling means in addition to its other functions. To renew the supply of distilled water all that it is necessary to do is to pour the water into the filling cup or funnel chamber 10, whereby the water is guided to flow downwardly through the filling opening or passage 12, and thence through the plug or cap chamber 7 into the cell chamber. As the supply of water is thus introduced into the cell, the indicator float rises as the same is buoyed up by the rising level of the electrolyte, so that the stem 14 likewise rises in the filling cup or funnel chamber 10 until the same arrives at its complete upwardly projected position, thus showing at a glance, without requirement of either test or guess work, when enough water has been added to the electrolyte. From the above it will be clear, that not only does the plug offer a great convenience as an indicator of the condition of the cell with respect to the electrolyte content thereof, but also provides an equally important convenience as a filling means for guiding the water for entrance into the cell, without necessity for removing the plug or cap. It therefore follows that not only convenience is served, but also time and trouble is saved in both assuring the condition of the cell and in bringing the cell back to normal condition when necessary. Since in a battery containing a plurality of cells, each cell is equipped with one of the novel indicating filling plugs or caps, the relative condition of the several cells is indicated at a glance without necessity for tedious tests, or time consuming manipulations of testing devices, either of a mechanical or of an electrical nature. In addition to the advantages above mentioned, the novel plug or cap fulfills the function of preventing escape of the electrolyte by outward splashing from the cell interior in the same manner as do the ordinary closing plugs or caps heretofore employed.

I am aware that some changes may be made in the general arrangements and combinations of the several devices and parts, as well as in the details of the construction thereof, without departing from the scope of the present invention as set forth in the foregoing specification, and as defined in the appended claim. Hence, I do not limit my invention to the exact arrangements and combinations of the various devices and parts as described in said specification, nor do I confine myself to the exact details of the construction of said parts as illustrated in the accompanying drawings.

I claim:—

The combination with a closure plug for storage batteries of a shank portion having means for detachably engaging the same in the top wall of a battery cell, an integral tubular extension of reduced diameter depending from the inner end of said shank so as to penetrate the fluid content of said battery cell, said plug having funnel depression in its exterior end provided in its bottom with a restricted opening communicating with the interior of said tubular extension, a slot in the side of said tubular extension leading transversely from the interior of said battery cell into the interior of said extension, and a float longitudinally movable in the interior of said extension, said float having a stem for projection upwardly through said restricted opening into the funnel depression of said plug.

In testimony, that I claim the invention set forth above I have hereunto set my hand this 11th day of February, 1921.

FREDERICK A. FELDKAMP.

Witnesses:
 FREDK. C. FRAENTZEL,
 EVA E. DESCH.